US010783656B2

(12) United States Patent
Korobov et al.

(10) Patent No.: US 10,783,656 B2
(45) Date of Patent: Sep. 22, 2020

(54) SYSTEM AND METHOD OF DETERMINING A LOCATION FOR PLACEMENT OF A PACKAGE (71) Applicant: Zebra Technologies Corporation, Lincolnshire, IL (US)

(72) Inventors: David Korobov, Wilmette, IL (US); Jay J. Williams, Glenview, IL (US); Cuneyt M. Taskiran, Chicago, IL (US); Yan Zhang, Buffalo Grove, IL (US); Sheida Gohari, Chicago, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 143 days.

(21) Appl. No.: 15/983,325

(22) Filed: May 18, 2018

(65) Prior Publication Data
US 2019/0355144 A1 Nov. 21, 2019

(51) Int. Cl.
*G06T 7/70* (2017.01)
*G08B 7/06* (2006.01)
*G06Q 10/08* (2012.01)
*G06T 7/11* (2017.01)

(52) U.S. Cl.
CPC ............. *G06T 7/70* (2017.01); *G06Q 10/083* (2013.01); *G06T 7/11* (2017.01); *G08B 7/06* (2013.01); *G06T 2207/10028* (2013.01); *G06T 2207/20132* (2013.01)

(58) Field of Classification Search
None
See application file for complete search history.

(56) References Cited

U.S. PATENT DOCUMENTS

| 4,408,782 | A  | 10/1983 | Condon |
| 5,265,006 | A  | 11/1993 | Asthana et al. |
| 5,430,831 | A  | 7/1995  | Snellen |
| 5,474,083 | A  | 12/1995 | Church et al. |
| 6,269,175 | B1 | 7/2001  | Hanna et al. |
| 6,332,098 | B2 | 12/2001 | Ross et al. |

(Continued)

FOREIGN PATENT DOCUMENTS

| DE | 10050385 A1 | 4/2002 |
| EP | 2178035 A1  | 4/2010 |

(Continued)

OTHER PUBLICATIONS

Office Action for Canadian Patent Application No. 2914800 dated Mar. 9, 2017.

(Continued)

*Primary Examiner* — Fayyaz Alam
(74) *Attorney, Agent, or Firm* — Yuri Astvatsaturov (57) ABSTRACT A method of determining a location for placement of a package in an imaging controller includes: obtaining depth data of a package space; detecting an occluded portion of the depth data representing an area of the package space obstructed by an occlusion; retrieving stored unobstructed depth data representing the area of the package space in the absence of the occlusion; replacing the occluded portion with the unobstructed depth data to generate patched depth data; obtaining, based on the patched depth data, a location within the package space for placement of a package; and presenting an indication of the location.

20 Claims, 9 Drawing Sheets

(56) References Cited

U.S. PATENT DOCUMENTS

| | | |
|---|---|---|
| 6,744,436 B1 | 6/2004 | Chirieleison, Jr. et al. |
| 7,455,621 B1 | 11/2008 | Anthony |
| 7,667,596 B2 | 2/2010 | Ozdemir et al. |
| 7,773,773 B2 | 8/2010 | Abercrombie et al. |
| 7,961,910 B2 | 6/2011 | Lee et al. |
| 8,269,616 B2 | 9/2012 | Uehara |
| 8,346,056 B2 | 1/2013 | M |
| 9,460,524 B1 | 10/2016 | Curlander et al. |
| 9,940,730 B2 | 4/2018 | Zhang et al. |
| 2002/0150294 A1 | 10/2002 | Cave et al. |
| 2003/0036935 A1 | 2/2003 | Nel |
| 2004/0066500 A1 | 4/2004 | Gokturk et al. |
| 2004/0125217 A1 | 7/2004 | Jesson et al. |
| 2005/0192702 A1 | 9/2005 | Moutsokapas |
| 2005/0199782 A1 | 9/2005 | Calver et al. |
| 2006/0056679 A1 | 3/2006 | Redert et al. |
| 2006/0061566 A1 | 3/2006 | Verma et al. |
| 2006/0239558 A1 | 10/2006 | Rafii et al. |
| 2007/0016538 A1 | 1/2007 | Bielefeld et al. |
| 2007/0025593 A1 | 1/2007 | Haupt et al. |
| 2007/0075853 A1 | 4/2007 | Griffin et al. |
| 2007/0297560 A1 | 12/2007 | Song et al. |
| 2008/0025565 A1 | 1/2008 | Zhang et al. |
| 2008/0042865 A1 | 2/2008 | Shephard et al. |
| 2008/0095404 A1 | 4/2008 | Abercrombie et al. |
| 2008/0201116 A1 | 8/2008 | Ozdemir et al. |
| 2008/0204225 A1 | 8/2008 | Kitchen |
| 2008/0303897 A1 | 12/2008 | Twitchell, Jr. |
| 2009/0121017 A1 | 5/2009 | Cato et al. |
| 2009/0135009 A1 | 5/2009 | Little et al. |
| 2010/0073476 A1 | 3/2010 | Liang et al. |
| 2010/0110185 A1 | 5/2010 | Tafazoli Bilandi et al. |
| 2010/0161170 A1* | 6/2010 | Siris ............... G06Q 10/0835 |
| | | 701/31.4 |
| 2010/0213313 A1* | 8/2010 | Reed ................... B64D 9/00 |
| | | 244/118.1 |
| 2010/0268675 A1 | 10/2010 | Baldes et al. |
| 2011/0106295 A1* | 5/2011 | Miranda ............ B65G 1/1378 |
| | | 700/216 |
| 2011/0264303 A1* | 10/2011 | Lenser ................ G05D 1/0038 |
| | | 701/2 |
| 2012/0155743 A1 | 6/2012 | Kim |
| 2012/0163723 A1 | 6/2012 | Balan et al. |
| 2012/0229646 A1* | 9/2012 | Grandidier ......... G06K 9/00201 |
| | | 348/149 |
| 2012/0243774 A1 | 9/2012 | Chen et al. |
| 2012/0283868 A1 | 11/2012 | Rutt et al. |
| 2013/0136338 A1 | 5/2013 | Asente et al. |
| 2013/0293539 A1 | 11/2013 | Hunt et al. |
| 2013/0342653 A1 | 12/2013 | McCloskey et al. |
| 2014/0055446 A1 | 2/2014 | Corral-Soto |
| 2014/0055560 A1* | 2/2014 | Fu ..................... G06T 5/005 |
| | | 348/42 |
| 2014/0123606 A1 | 5/2014 | Ehrat |
| 2014/0247261 A1 | 9/2014 | Lenser et al. |
| 2014/0350719 A1 | 11/2014 | Fleischmann et al. |
| 2014/0372182 A1* | 12/2014 | Groble .................. G06Q 50/28 |
| | | 705/7.38 |
| 2014/0372183 A1 | 12/2014 | Groble et al. |
| 2015/0042767 A1* | 2/2015 | Ciurea ............... G02B 27/0075 |
| | | 348/48 |
| 2015/0170256 A1 | 6/2015 | Pettyjohn et al. |
| 2015/0248765 A1 | 9/2015 | Criminisi et al. |
| 2015/0332075 A1 | 11/2015 | Burch |
| 2016/0238374 A1 | 8/2016 | Burch et al. |
| 2016/0238425 A1 | 8/2016 | Burch et al. |
| 2016/0239790 A1 | 8/2016 | Burch et al. |
| 2016/0239791 A1 | 8/2016 | Burch et al. |
| 2016/0239792 A1 | 8/2016 | Burch et al. |
| 2016/0239795 A1 | 8/2016 | Burch et al. |
| 2016/0239799 A1 | 8/2016 | Burch et al. |
| 2016/0239801 A1 | 8/2016 | Burch et al. |
| 2016/0239802 A1 | 8/2016 | Burch et al. |
| 2017/0140550 A1 | 5/2017 | Zhang et al. |
| 2017/0178333 A1* | 6/2017 | Zhang ................. G06Q 10/083 |
| 2017/0236296 A1* | 8/2017 | Breedvelt-Schouten .................. |
| | | G06K 9/00671 |
| | | 382/154 |

FOREIGN PATENT DOCUMENTS

| | | |
|---|---|---|
| EP | 2302564 A1 | 3/2011 |
| GB | 1010162 A | 11/1965 |

OTHER PUBLICATIONS

Extended Search Report for European Patent Application No. 14737390.6 dated Oct. 24, 2017.

Office Action for Australian Patent Application No. 2014281000 dated Aug. 11, 2016.

Office Action for Canadian Patent Application No. 2914800 dated Aug. 25, 2016.

Simulate point clouds of packages loaded in trailers: http://bl.ocks.org.michael-groble/4588547, Jan. 21, 2013.

International Search Report & Written Opinion for International Patent Application No. PCT/US2016/061279 dated Apr. 4, 2017.

* cited by examiner

SYSTEM AND METHOD OF DETERMINING A LOCATION FOR PLACEMENT OF A PACKAGE

BACKGROUND

The transportation and storage of objects such as packages typically requires the packages to be loaded manually, by a loading operator (also referred to as a loader), into containers (e.g. trailers, shipping containers and the like). When loading containers with packages, the loader typically seeks to maximize utilization of the space within the containers to reduce the number of containers (and the costs associated with each container) required to handle the packages. Utilization of space is typically assessed by the loader during the loading process, and can therefore vary widely based on loader experience. Attempts to provide automated assistance to the loader for assessing utilization of space and selecting package placement locations may be impeded by the variable size and shape of the packages and the containers, as well as difficulties in acquiring accurate machine-usable representations of the current state of the container.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of determining a location for placement of a package in an imaging controller. The method includes: obtaining depth data of a package space; detecting an occluded portion of the depth data representing an area of the package space obstructed by an occlusion; retrieving stored unobstructed depth data representing the area of the package space in the absence of the occlusion; replacing the occluded portion with the unobstructed depth data to generate patched depth data; obtaining, based on the patched depth data, a location within the package space for placement of a package; and presenting an indication of the location.

Additional examples disclosed herein are directed to a computing device for determining a location for placement of a package, the computing device comprising: a communications interface coupled to a data capture device; a memory; and an imaging controller connected to the memory and the communications interface, the imaging controller configured to: obtain depth data representing a package space; detect an occluded portion of the depth data representing an area of the package space obstructed by an occlusion; retrieve stored unobstructed depth data representing the area of the package space in the absence of the occlusion; replace the occluded portion with the unobstructed depth data to generate patched depth data; obtain, based on the patched depth data, a location within the package space for placement of a package; and present an indication of the location.

Figure 1:
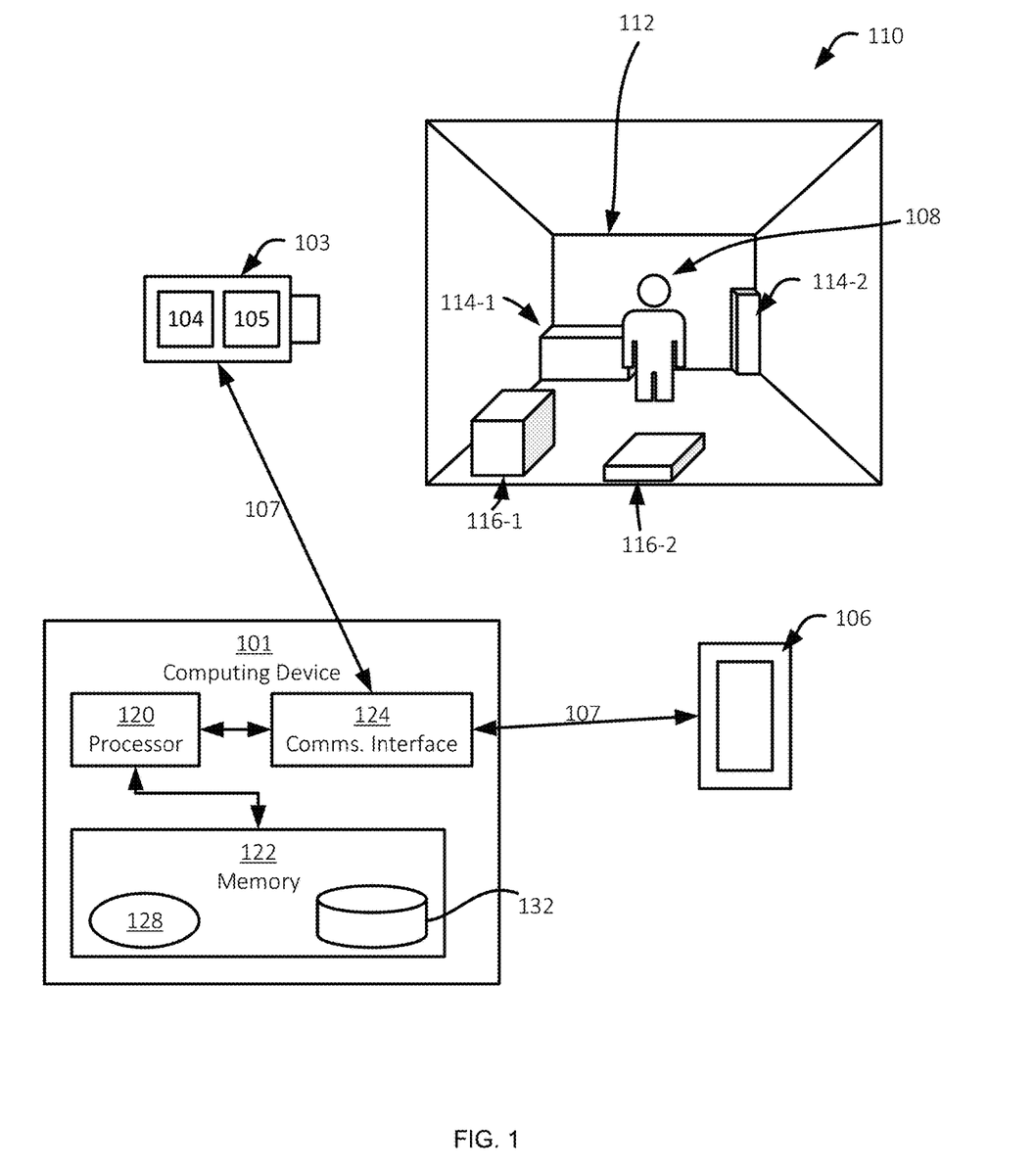
FIG. 1 is a schematic of a package placement system.

FIG. 1 depicts a package placement system 100 in accordance with the teachings of this disclosure. The system 100 includes a computing device 101 in communication with an imaging device 103 and a feedback device 106 via communication links 107. The system 100 is deployed, in the illustrated example, in a package space 110 for loading packages. The package space 110 includes a container having side walls, a ceiling, a floor, a rear wall and a loading end. The package space 110 includes a package wall 112 including loaded packages 114-1, 114-2, and so on (collectively referred to as loaded packages 114, and generically referred to as a loaded package 114), the rear wall of the container, or a combination of the loaded packages 114 and the rear wall, as visible by the imaging device 103. The package space 110 may further include a plurality of staged or queued packages 116-1, 116-2, and so on (collectively referred to as packages 116, and generically referred to as a package 116). A loader 108 is in the package space 110 obstructing a portion of the package wall 112. The imaging device 103 is therefore positioned at the loading end to capture image data and depth data representing the package space 110. For example, the imaging device 103 may be positioned in the container, or at a dock door of the container facing the package wall 112.

More specifically, the imaging device 103 is deployed to capture image data and depth data of the package space 110 and communicates with the computing device 101 for post-processing. The device 103 includes an image sensor 104 (e.g. one or more digital cameras) and a depth sensor 105 (e.g. one or more Light Detection and Ranging (LIDAR) sensors or one or more depth cameras, including those employing structured light patterns, such as infrared light, and/or stereo image sensors). Alternatively or in addition, depth may be determined based on a focal length of the optics of the imaging device 103. In the present example, the device 103, and in particular the depth sensor 105 is configured to capture depth data (also referred to herein as a frame or a set of depth data) including a plurality of depth measurements corresponding to packages 114 or 116 or other objects, such as the loader 108 placing the packages inside the package space 110. Each measurement defines a distance from the depth sensor 105 to a point in the package space 110. The device 103, and in particular the image sensor 104, is configured to capture image data (also referred to herein as a frame or a set of image data) of the package space 110. The device 103 may be a depth camera having an integrated depth sensor 105 and image sensor 104. In other embodiments, the image sensor 104 and the depth sensor 105 may be implemented as independent sensors rather than as an integrated device 103.

The computing device 101 may be a desktop computer, a laptop computer, a server, a kiosk, or other suitable device. In other examples, the computing device 101 includes a mobile computing device such as a tablet, smart phone or the like. The computing device 101 includes a special purpose imaging controller, such as a processor 120, specifically designed to control the imaging device 103 to capture data (e.g. the above-mentioned depth data and/or image data), obtain the captured data via a communications interface 124 and store the captured data in a repository 132 in a memory 122. The computing device 101 is further configured to perform various post-processing operations on the captured data to detect certain structural features—such as the loader 108—within the captured data. The post-processing of captured data by the computing device 101 will be discussed below in greater detail.

The processor 120 is interconnected with a non-transitory computer readable storage medium, such as the above-mentioned memory 122, having stored thereon computer readable instructions for executing control of the device 101 to capture data, as well as the above-mentioned post-processing functionality, as discussed in further detail below. The memory 122 includes a combination of volatile (e.g. Random Access Memory or RAM) and non-volatile memory (e.g. read only memory or ROM, Electrically Erasable Programmable Read Only Memory or EEPROM, flash memory). The processor 120 and the memory 122 each comprise one or more integrated circuits. In an embodiment, the processor 120 includes one or more central processing units (CPUs) and/or graphics processing units (GPUs). In an embodiment, a specially designed integrated circuit, such as a Field Programmable Gate Array (FPGA), is designed to perform the functions as described herein, either alternatively or in addition to the imaging controller/processor 120 and the memory 122. As those of skill in the art will realize, the imaging device 103 also includes one or more controllers or processors and/or FPGAs, in communication with the controller 120, specifically configured to control data capture aspects of the device 103. The feedback device 106 also includes one or more controllers or processors and/or FPGAs, in communication with the controller 120, specifically configured to present (e.g. to display) location indications received from the computing device 101. The feedback device 106 may be a mobile computing device such as a tablet, smart phone, or it may be a display, such as a monitor, peripheral to the computing device 101.

The computing device 101 also includes the above-mentioned communications interface 124 interconnected with the processor 120. The communications interface 124 includes suitable hardware (e.g. transmitters, receivers, network interface controllers and the like) allowing the computing device 101 to communicate with other computing devices—particularly the device 103 and the feedback device 106—via the links 107. The links 107 may be direct links, or links that traverse one or more networks, including both local and wide-area networks. The specific components of the communications interface 124 are selected based on the type of network or other links that the computing device 101 is required to communicate over.

The memory 122 stores a plurality of applications, each including a plurality of computer readable instructions executable by the processor 120. The execution of the above-mentioned instructions by the processor 120 configures the computing device 101 to perform various actions described herein. The applications stored in the memory 122 include a control application 128, which may also be implemented as a suite of logically distinct applications. In general, via execution of the control application 128 or subcomponents thereof, the processor 120 is configured to implement various functionality. The processor 120, as configured via the execution of the control application 128, is also referred to herein as the controller 120. As will now be apparent, some or all of the functionality implemented by the controller 120 described below may also be performed by preconfigured hardware elements (e.g. one or more Application-Specific Integrated Circuits (ASICs)) rather than by execution of the control application 128 by the processor 120.

In the present example, in particular, the computing device 101 is configured via the execution of the control application 128 by the processor 120, to process image and depth data captured by the device 103 to detect and replace occlusions, such as the loader 108, in the package space 110, and to determine a location for placement of a package 116.

The memory 122 stores image data and depth data in the repository 132. For each frame (i.e. a set of depth measurements forming a point cloud and a set of image pixels representing the package space 110) captured by the image sensor 104 and/or the depth sensor 105, the imaging device 103 interfaces with the computing device 101 to store current image data and the current depth data in the repository 132. The repository 132 also stores unobstructed depth data and unobstructed image data for patching occluded portions, as will be described further below. The repository 132 also stores package metadata for loaded packages 114 and packages 116 to be loaded. The package metadata includes package dimensions, weight, destination, and so on.

The depth data can take a variety of forms, according to the depth sensor employed (e.g. by the device 103) to capture the depth data. For example, the device 103 may include a depth camera, such as a stereoscopic camera including a structured light projector (e.g. which projects a pattern of infrared light onto the package space). In such examples, the device 103 captures sets of depth data. The sets of depth data each include an array of depth measurements (e.g. an array of depth values in meters or another suitable unit). The array can also contain intensity values (e.g. an array of values, with each value ranging from 0 to 255) which map to depth values, rather than the depth values themselves. The depth data thus defines a 3D point cloud. Similarly, the image data may take a variety of forms, according to the image sensor employed (e.g. by the device 103) to capture the image data. For example, the image sensor 104 may capture sets of image data, each including an array of pixels, with each pixel containing an image value (e.g. an RGB color value).

In some examples, the device 103 may be configured to simultaneously capture image data and depth data using the image sensor 104 and the depth sensor 105 respectively. The device 103 may further be configured to store an association of image data and depth data in the repository 132. For example, the repository 132 may store a mapping of image pixels from the image data pixel array to depth pixels from the depth data array. In some examples, the mapping may be a one-to-one mapping between the pixel arrays, while in other examples, the mapping may be a one-to-many mapping or a many-to-one mapping, according to the respective resolutions of image sensor 104 and the depth sensor 105. More generally, the depth data and the image data are registered to one another, such that a given depth measurement, by its position in the array of depth measurements, corresponds (i.e. represents the same portion of the package space 110) to a known image pixel or group of pixels in the image data.

Figure 2:
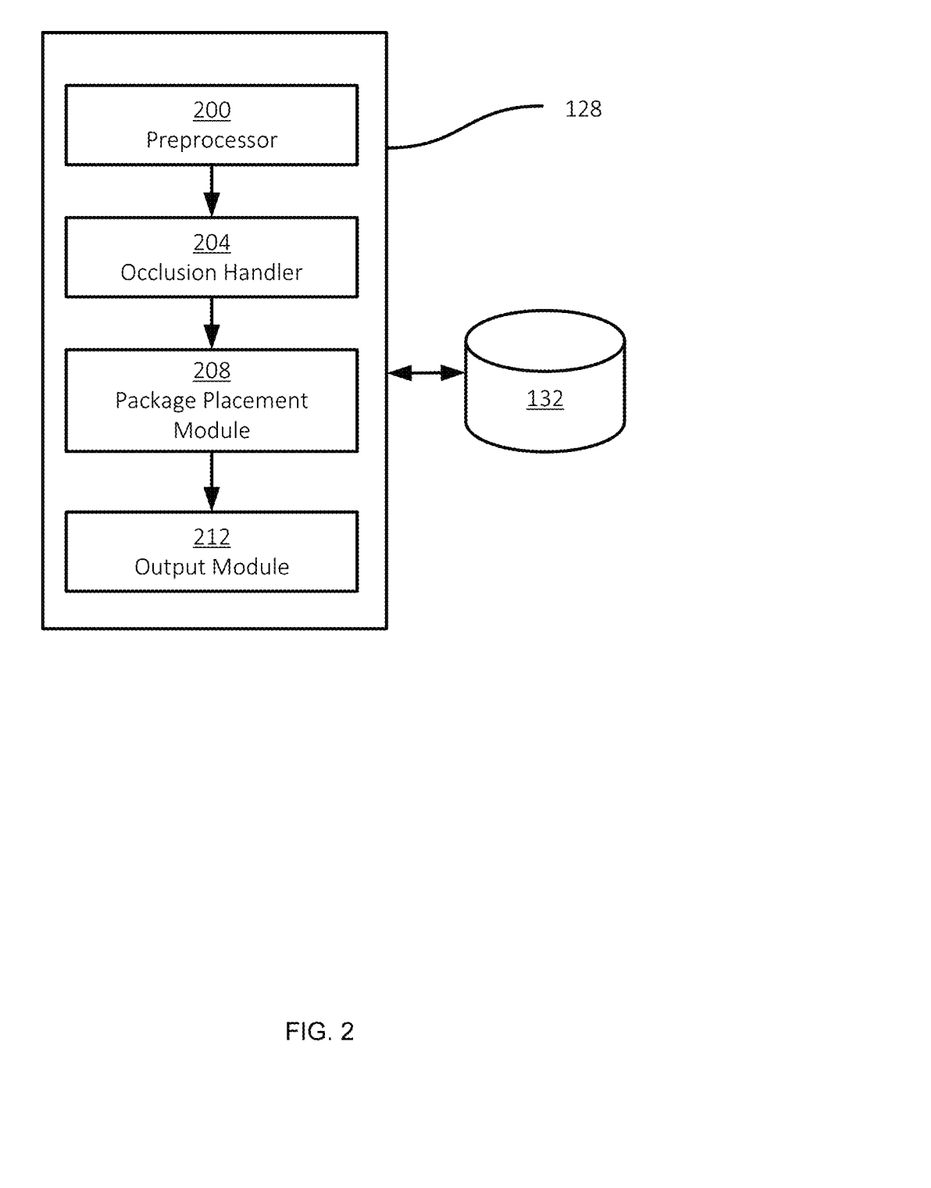
FIG. 2 is a block diagram of certain internal components of a computing device in the system of FIG. 1.

Turning now to FIG. 2, before describing the operation of the application 128 to determine a location for placement of a package, certain components of the application 128 will be described in greater detail. As will be apparent to those skilled in the art, in other examples, the components of the application 128 may be separated into distinct applications, or combined into other sets of components. Some or all of the components illustrated in FIG. 2 may also be implemented as dedicated hardware components, such as one or more ASICs or FPGAs. For example, in one embodiment, to improve reliability and processing speed, at least some of the components of FIG. 2 are programmed directly into the imaging controller 120, which may be an FPGA or an ASIC having circuit and memory configuration specifically designed to optimize image processing of a high volume of sensor data received from the imaging device 103. In such an embodiment, some or all of the control application 128, discussed below, is an FPGA or an ASIC chip.

The control application 128 includes a preprocessor 200 configured to obtain image data and depth data representing the package space 110 and perform filtering operations on the captured data. The control application 128 also includes an occlusion handler 204 configured to detect and replace an occluded portion of the captured data. The control application 128 also includes a package placement module 208 configured to crop out package clutter, generate a 2D occupancy matrix, and generate a location for placement of the package based on the occupancy matrix. The location for placement of the package is optimized for load quality and stability as well as space within the package space 110. The control application 128 also includes an output module 212 configured to present an indication of the location for placement of the package.

Figure 3:
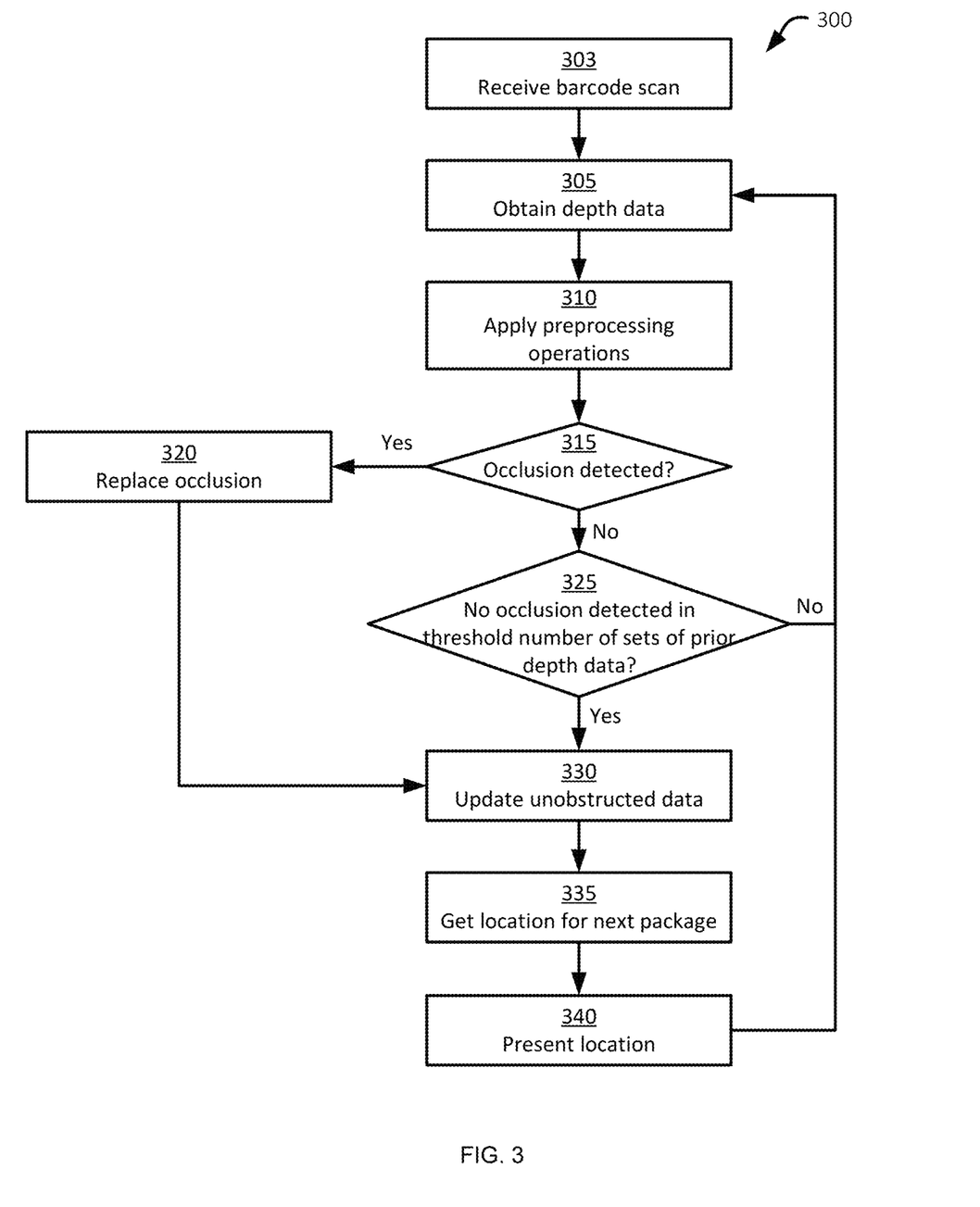
FIG. 3 is flowchart of a method determining a location for placement of a package.

The functionality of the control application 128 will now be described in greater detail. Turning to FIG. 3, a method 300 of determining a location for placement of a package is shown. The method 300 will be described in conjunction with its performance on the system 100 and with reference to the components illustrated in FIG. 2. In other words, in the discussion below, the package is a package 116 and the location for placement to be determined is a location in the package space 110. In other examples, a location for placement of other packages in other package spaces may be determined via performance of the method 300.

At block 303, the controller, 120, and in particular the preprocessor 200, is configured to receive a barcode scan of the package 116 to be loaded. The barcode scan may correspond to a package identifier of the package 116. For example, the loader 108 may operate a barcode scanner to scan a barcode associated with the package 116. In other examples, the preprocessor 200 may receive a different indication of the package identifier of the package 116. For example, the package identifier may be entered manually, selected from a list, received from reading an RFID (Radio Frequency Identification) or NFC (Near Field Communication) tag via a corresponding reader device, or otherwise provided to the preprocessor 200. In some examples, the barcode scanner or other package identifier provider may be integrated with the feedback device 106 (e.g. a barcode scanning application or package management application of a smart phone). The preprocessor 200 is configured to look up the identifier in the repository 132 and obtain package metadata, such as package weight, dimensions, destination and so on, associated with the package identifier and stored in the repository 132. In other examples, the package metadata may be stored remotely, such as on a remote server, and the computing device 101 may be configured to request the package metadata from the remote server.

At block 305, the controller 120, and in particular the preprocessor 200, is configured to obtain image data and depth data captured by the image sensor 104 and the depth sensor 105 respectively and corresponding to the package space 110. In other words, in the present example, the depth data corresponds to the package space 110 containing the loaded packages 114 associated with the package wall 112, the staged and queued packages 116 to be loaded, the container, and the loader 108 or any other occlusions in the package space 110. The depth data obtained at block 305 is, for example, captured by the imaging device 103 and stored in the repository 132. The preprocessor 200 is therefore configured, in the above example, to obtain the depth data by retrieving the data from the repository 132. In other examples, the preprocessor 200 is configured to control the device 103 to capture the image data and the depth data.

The control application 128 is then configured to proceed to block 310. At block 310, the preprocessor 200 is configured to perform one or more preprocessing operations on the depth data. In the present example, the preprocessing operations include calibrating the depth data, noise filtering, and discarding sets of depth data with a high proportion of missing depth values.

Figure 4:
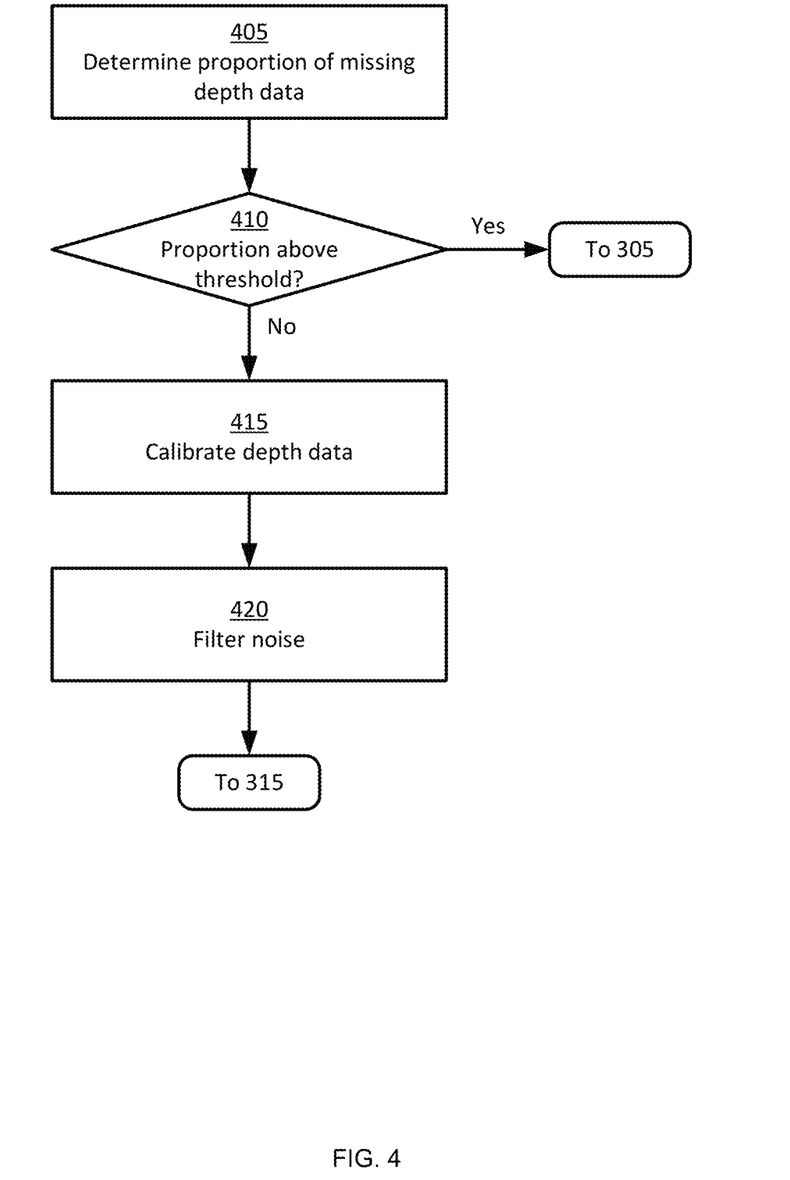
FIG. 4 depicts an embodiment of a method for performing block 310 of the method of FIG. 3.

Referring to FIG. 4, a method 400 of performing preprocessing operations is depicted.

At block 405, the preprocessor 200 determines a proportion of missing depth data. Missing depth data may include depth measurements in the array for which no depth value was obtained (e.g. due to an obstruction sufficiently close to the sensor 105 as to prevent the sensor 105 from obtaining a reading), or depth measurements in the array which were discarded. For example, when a loader or other occlusion is close to the sensor 105, the depth values obtained may be below a predefined minimum threshold distance, and hence presumed to be inaccurate and discarded.

At block 410, when the proportion is above a predefined threshold (e.g. 50-60%), the preprocessor 200 is configured to discard the depth data and return to block 305 of the method 300 to obtain new depth data. When the proportion is below the predefined threshold, the preprocessor 200 is configured to proceed to block 415.

At block 415, the preprocessor 200 is configured to calibrate the depth data and rotate the point cloud such that the plane of the package wall 112 is perpendicular to the viewing angle of the imaging device 103. In the present example, the preprocessor 200 uses two iterations of random sample consensus (RANSAC) plane fitting. In the first iteration, RANSAC plane fitting is applied to the full set of depth data as obtained at block 305 to obtain a subset of depth data representing approximate locations of the major planes defining the container (i.e. the container side walls, floor, and ceiling). In the second iteration, RANSAC plane fitting is applied to the subset of depth data to obtain a more accurate plane fit. The preprocessor 200 then determines an angle of one or more of the planes (e.g. the plane of the rear wall) and compares it to a preset angle (e.g. 90 degrees to the depth sensor 105) to determine an angle of rotation. The preprocessor 200 then rotates the point cloud by the angle of rotation. Hence, in the present example, the plane of the rear wall is rotated to be orthogonal to the camera angle.

At block 420, the preprocessor 200 is configured to filter noise from the depth data. Specifically, for a given point in the point cloud, the preprocessor 200 selects a radius and a threshold number of points for applying a radius outlier filter. For the given point, the preprocessor 200 determines if there are at least the threshold number of points in the point cloud within a sphere centered at the given point and having the selected radius. When the given point does not have at least the threshold number of points in the point cloud with the sphere having the selected radius, the given point is determined to be noise, and the depth value is discarded. In some examples, the noise filtering at block 420 is performed prior to block 405 to determine the proportion of missing depth data in consideration of the discarded noise.

In the present example, the preprocessor 200 is further configured to vary the parameters of the radius outlier filter based on the depth value of the selected point to account for distance from the depth sensor 105. For points closer to the depth sensor 105, the radius is smaller, and the threshold number of points is higher. For points further from the depth sensor 105, the radius is larger, and the threshold number of points is lower.

Figure 5:
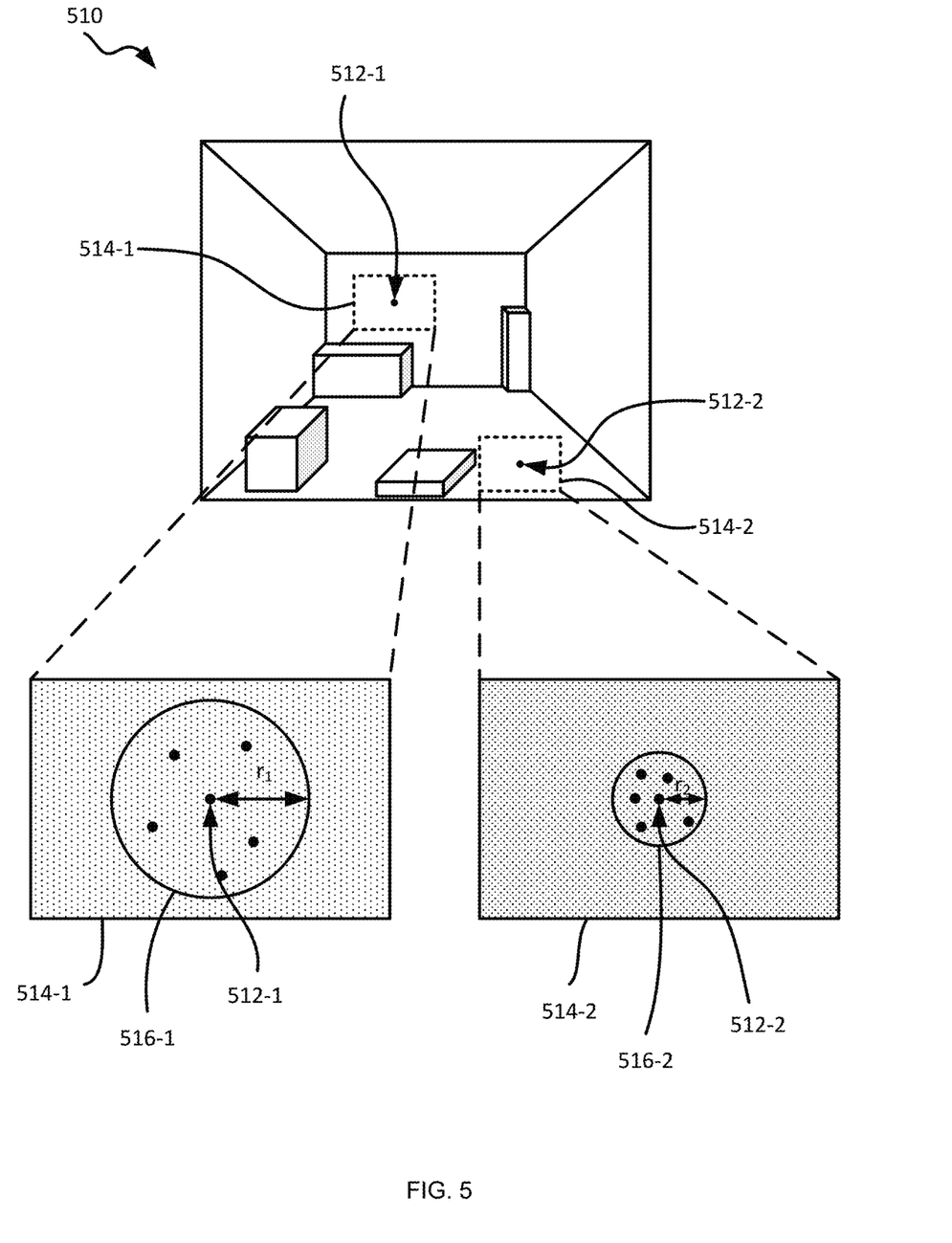
FIG. 5 depicts noise filtering employed in the method of FIG. 4.

FIG. 5 illustrates an application of the variable radius outlier filter by the preprocessor 200. In particular, the variable radius outlier filter is applied to a first point 512-1 and a second point 512-2 in a package space 510. In the example of FIG. 5, the first point 512-1 is near the package wall, while the second point 512-2 is near the loading end of the package space, hence the point 512-1 is further from the depth sensor 105 than the point 512-2.

FIG. 5 further depicts enlarged illustrations of regions 514-1 and 514-2 of the point cloud containing the first point 512-1 and the second point 512-2 respectively. Since the region 514-1 is further away from the depth sensor 105 than the region 514-2, the point cloud of the region 514-1 is more sparsely populated and has a lower depth pixel density than the point cloud of the region 514-2. That is, each point in the point cloud of the region 514-1 represents a larger physical area than a point in the point cloud of the region 514-2. Thus, the radius outlier filters 516-1 and 516-2 are varied to accommodate the difference in depth data granularity and to maintain a similar noise filtering quality. For example, the radius outlier filter 516-1 for the point 512-1 may have a radius $r_1$ of 8 cm and a threshold number of points of 4. In the example of FIG. 5, the point 512-1 has 5 points within the radius $r_1$ of the radius outlier filter 516-1, and hence the point 512-1 is a valid point. In contrast, the radius outlier filter 516-2 for the point 512-2 may have a radius $r_2$ of 2 cm and a threshold number of points of 50. In the example of FIG. 5, the point 512-2 also has 5 points within the radius $r_2$ of the radius outlier filter 516-2, and hence is considered noise. That is, since the point 512-2 has a higher point cloud pixel density, it is expected that for a valid point, a larger number of points will be nearby (i.e. within a sphere centered around the point 512-2).

Returning to FIG. 3, the control application 128 is then configured to proceed to block 315. At block 315, the controller 120, and more specifically the occlusion handler 204, is configured to determine whether an occluded portion of the preprocessed depth data is detected. The occluded portion represents an area of the package space obstructed by an occlusion, specifically, the loader 108. When an occluded portion is detected, the control application 128 proceeds to block 320. At block 320, the occlusion handler 204 is configured to replace the occluded portion with unobstructed data to generate patched data.

Figure 6:
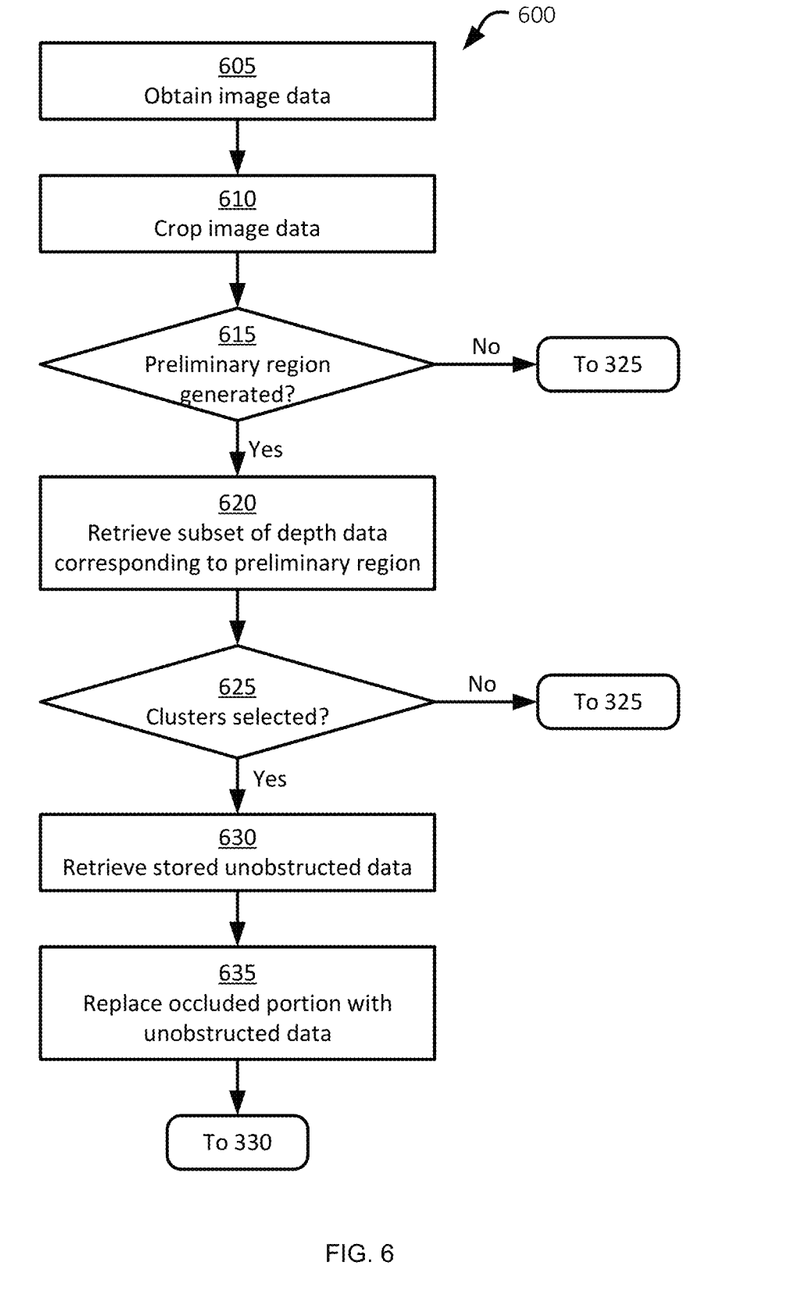
FIG. 6 depicts an embodiment of a method for performing blocks 315 and 320 of the method of FIG. 3.

Turning now to FIG. 6, a method 600 of detecting and replacing an occluded portion is shown. In particular, the occlusion handler 204 is configured to perform the method 600 using the preprocessed depth data generated at block 310. The performance of the method 600 results in a sequence 700 of image data and depth data results shown in FIG. 7. Accordingly, the method 600 of FIG. 6 and the sequence 700 of FIG. 7 will be described in tandem.

Figure 7:
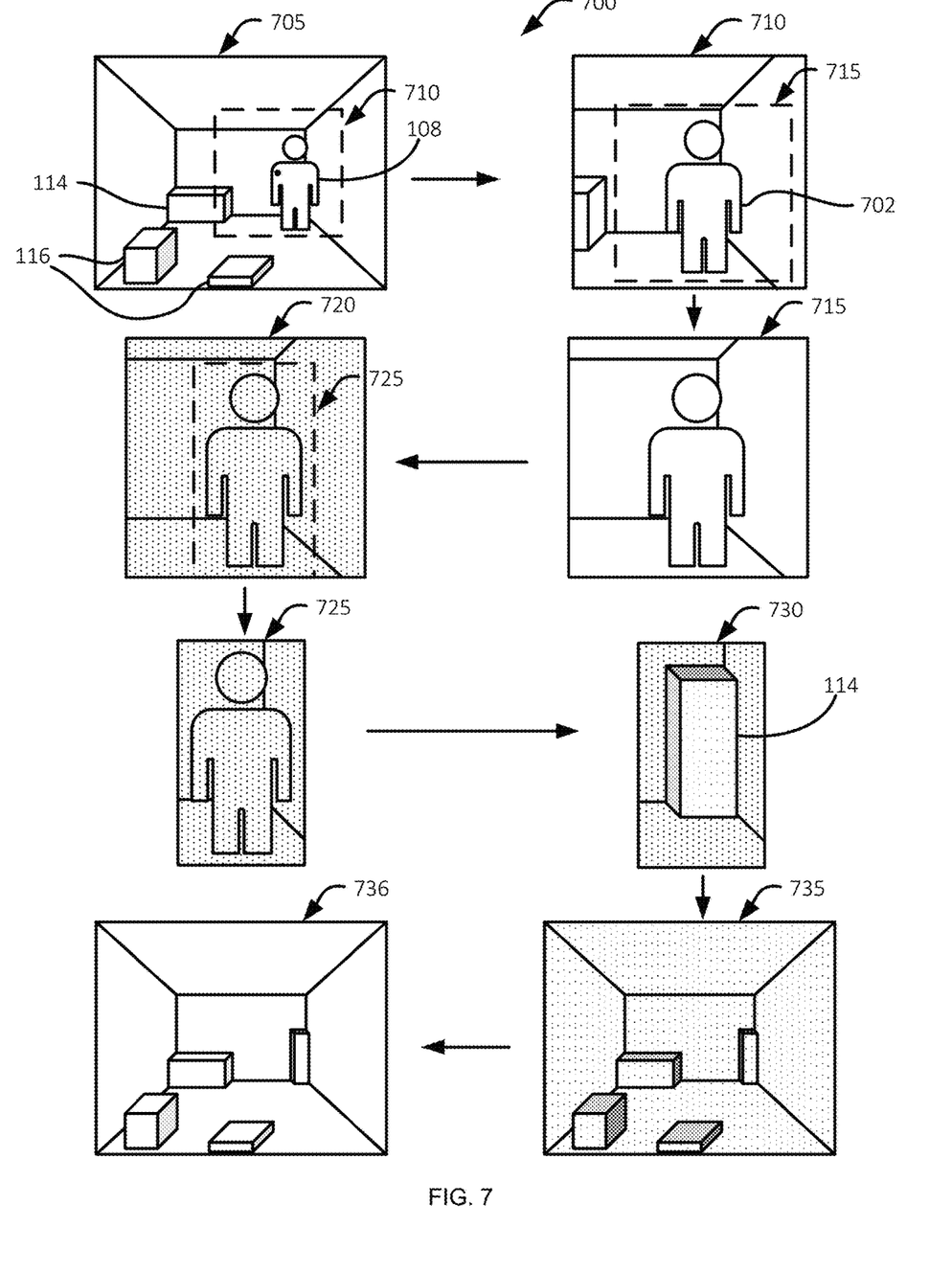
FIG. 7 depicts results of the performance of the method of FIG. 6.

At block 605, the occlusion handler 204 is configured to obtain image data 705 captured by the image sensor 104 and corresponding to the package space 110. In the present example, the image data 705 represents a package space including packages 114 and 116 and a loader 108. The image data 705 obtained at block 605 is, for example, captured by the image sensor 104 simultaneously with the depth data captured by the depth sensor 105 and stored in the repository 132. The occlusion handler 204 is therefore configured, in the above example, to obtain the image data by retrieving the image data from the repository 132.

At block 610, the occlusion handler 204 is configured to crop the image data 705 obtained at block 605 to generate cropped image data 710. Specifically, the occlusion handler 204 may crop the image data 705 according to an aspect ratio expected by an occlusion detector of the occlusion handler 204. By cropping the image data and accounting for the aspect ratio of the occlusion detector, shape distortion and shrinkage of the image data is reduced.

In some examples, the occlusion handler 204 may be configured to determine whether a prior occlusion was detected in a prior frame. For example, the occlusion handler 204 may reference prior depth data stored in the repository 132. When a prior occlusion was detected, the occlusion handler 204 sets a crop center to a center of the prior occlusion. The occlusion handler 204 sets crop dimensions based on the dimensions of the prior occlusion, a predefined minimum padding amount and the aspect ratio expected by the occlusion detector. For example, for a system capturing frames at 3 frames per second (fps), the minimum padding amount may be 100 pixels. At a frame rate of 3 fps, and based on a maximum distance a human can move in that time, this minimum padding amount allows the occlusion handler 204 to safely assume that the loader 108 will remain in the cropped image data 710. In other examples, systems operating at different frame rates may have a different minimum padding amount defined to allow the assumption that the loader 108 will remain in the cropped image data 710. In some examples, the minimum padding amount may also vary based on the depth value of the prior occlusion. Thus, the occlusion handler 204 tracks the occlusion over successive performances of the method 300, via capture of separate frames (e.g. a loader moving to different positions in the package space 110). The occlusion tracking allows the occlusion handler 204 to provide cropped image data 710 according to the aspect ratio expected by the occlusion detector, while maintaining the occlusion within the cropped image data.

In the example of FIG. 7, the cropped image data 710 tracks the prior occlusion and hence is centered around the point 711, representing the center of the prior occlusion. The crop dimensions are set based on the prior occlusion and padded by at least the minimum padding amount. The crop dimensions may be further padded to meet the aspect ratio expected by the occlusion detector.

In other examples, the occlusion handler 204 may crop the image data according to predefined default dimensions and based on a center of the captured image data. For example, when the system initializes, when no prior occlusion was detected (e.g. because the loader 108 moved out of view of the imaging device 103), or when occlusion tracking is otherwise not used (e.g. when the image/depth data is captured infrequently), the occlusion handler 204 crops the image data according to predefined default dimensions around the center of the captured image data and according to the aspect ratio expected by the occlusion detector. For example, for an image sensor having a resolution of 1920× 1080, the predefined default dimensions may be 1000×1000 pixels.

At block 615, the occlusion handler 204 provides the cropped image data 710 to the occlusion detector to generate a preliminary region 715 approximating the location of an occlusion. The occlusion detector accepts image data having a predefined resolution. Accordingly, the cropped image data 710 generated at block 610 is cropped based on the predefined resolution. In some examples, the cropped image data 710 may be cropped to have the same aspect ratio, hence at block 615, the occlusion handler 204 may downsize the cropped image data 710 prior to providing the cropped image data 710 to the occlusion detector. In other examples, the cropped image data 710 may be cropped to the predefined resolution accepted by the occlusion detector. In the example of FIG. 7, the occlusion identified by the preliminary region 715 is the loader 702.

The occlusion detector may include a GPU employing machine learning algorithms to generate a preliminary region representing an occlusion, specifically the loader 108, in the package space 110. For example, the occlusion detector may employ a convolutional neural network, such as YOLO (You Only Look Once) or Darknet, configured to identify human figures. In some examples, the neural network or other suitable machine learning algorithm may be specifically trained to identify the loader 108 within a loading environment such as the package space 110. In some examples, the preliminary region 715 may include two or more portions, each portion representing a human figure identified by the occlusion detector.

When no occlusion is detected at block 615, the control application 128 is configured to proceed to block 325 of the method 300, as will be described further below. When an occlusion is detected and the preliminary region 715 is generated by the occlusion handler 204, the control application 128 proceeds to block 620.

At block 620, the occlusion handler 204 retrieves a subset of the depth data 720 corresponding to the image data within the preliminary region 715. For example, the occlusion handler 204 may look up the mapping of image data to depth data stored in the repository 132 to retrieve the depth data 720.

At block 625, the occlusion handler 204 detects the occluded portion 725 from the subset of the depth data 720. Specifically, the occlusion handler 204 selects clusters of the depth data 720 by comparing the depth data 720 to predefined occlusion identifiers defining structural properties of an expected occlusion. In the example of FIG. 7, the occlusion identifiers may include average height, width and depth ranges of a human figure to select clusters representing the loader 108. For example, the occlusion handler 204 may employ, in a first stage, Euclidean clustering to find candidate clusters within the subset 720 of the point cloud.

In a second stage, the occlusion handler 204 compares attributes of the candidate clusters to the occlusion identifiers for selection. Specifically, the occlusion handler 204 selects clusters according to predefined minimum and maximum heights, widths and depths, and according to a minimum number of points in the cluster. For example, the occlusion handler 204 may select a single cluster having a height between 1 meter (m) and 2 m, a width between 0.5 m and 1 m and a depth between 0.5 m and 1 m. In other examples, the occlusion handler 204 may select more than one cluster according to human body parts (e.g. a head cluster, a torso cluster, and one or more limb clusters). Thus, the selected clusters (i.e. the occluded portion 725) approximate a human figure. In the present example, the occluded portion 725 is shown as a box, however, in other examples, the occluded portion 725 may be the areas represented by the selected clusters.

When the preliminary region 715 includes two or more portions, the occlusion handler 204 is configured to select clusters representing an approximation of a human figure in each portion. In other words, the occlusion handler 204 checks for a loader 702 in each portion of the preliminary region. When no clusters are selected at block 625 (i.e. no clusters within the preliminary region meet the threshold occlusion identifier values), the occlusion handler 204 determines at block 315 of the method 300 that no occlusion is detected and proceeds to block 325 of the method 300.

At block 630, the occlusion handler 204 retrieves stored unobstructed depth data representing the area of the package space in the absence of the occlusion (i.e. the area containing the loader 108). For example, the occlusion handler 204 retrieves unobstructed depth data stored in the repository 132. The updating of the unobstructed depth data will be discussed in further detail below. In particular, the imaging device 103 is assumed to be stationary relative to the package space 110, and hence pixels having the same pixel coordinates in the pixel array are assumed to represent same area of the package space. Accordingly, the occlusion handler 204 is configured to retrieve a portion 730 of the unobstructed depth data having the same pixel coordinates as the occluded portion 725. In some examples, the occlusion handler 204 may further retrieve stored unobstructed image data associated with the unobstructed depth data 730, for example, as defined by the mapping of image data to depth data stored in the repository 132. In the present example, the portion 730 includes a package 114 which was occluded by the loader 108.

At block 635, the occlusion handler 204 replaces the occluded portion 725 with the portion 730 of the unobstructed depth data to generate patched depth data 735. Where the occlusion handler 204 retrieves the unobstructed image data, the occlusion handler 204 replaces the image data associated with the occluded portion with the unobstructed image data 736. Thus, the occlusion handler 204 generates patched depth data and image data representing the package space in the absence of the occlusion. The control application 128 is then configured to proceed to block 330 of the method 300.

Returning to FIG. 3, when no occlusion is detected at block 315, and in particular at block 615 of the method 600, the control application 128 is configured to proceed to block 325. At block 325, the controller 120, and in particular the occlusion handler 204, is configured to determine if an occlusion was detected in a threshold number of prior sets of depth data. In particular, prior to capturing the current depth data, the controller 120 obtains a plurality of prior sets of depth data (e.g. from prior frames). When no occlusion is detected for the current depth data, and no occlusion was detected for a threshold number of the plurality of prior sets of depth data, the control application 128 is configured to proceed to block 330. For example, after 5 seconds of not detecting the loader 108 (i.e. a threshold number of 15 sets of depth data at a frame rate of 3 fps), it is assumed that the loader 108 is not in the package space 110. At block 330, the occlusion handler 204 stores the current depth data (i.e. the depth data as originally captured, in which no occlusion was detected, or the patched data, as described further below) as the unobstructed depth data. Additionally, the current image data may be stored as unobstructed image data.

For example, if at block 315, the occlusion handler 204 produces a false negative result (i.e. the occlusion handler 204 does not detect an occlusion, but an occlusion is present), block 325 provides a check to reduce the likelihood of saving the false negative result as updated unobstructed data and preserves the integrity of the unobstructed depth data. Specifically, if an occlusion was detected in the prior frame, it is unlikely that the occlusion has completely left the field of vision of the imaging device 103 (e.g. at a frame rate of 3 fps, a loader cannot move sufficiently quickly to be present in one frame and absent in the next), hence the control application 128 proceeds to block 305 to obtain new depth data. On the other hand, if at block 325, no occlusion is detected for a threshold number of sets of depth data, it may be reasonably assumed that no occlusion is present (e.g. the loader has indeed left the field of vision of the imaging device 103), and hence the control application 128 proceeds to block 330 to store the current depth data as the unobstructed depth data.

In some examples, the threshold number of prior sets of depth data may be varied based on the distance of the most recently detected occlusion to the edge of the frame and/or the frequency of capturing depth data. For example, if a loader is close to the edge of the frame, the number of frames required to leave the field of vision of the imaging device 103 is smaller than if the loader is in the center of the frame.

In the above example, the method 300 may still result in some instances of false negatives being saved as unobstructed data (i.e. saving frames where a loader is visible as unobstructed data), resulting in the following images being patched with the "dirty" unobstructed data. However, the movement of the loader within the package space will, over time, cause the "dirty" unobstructed data to be patched over with clean unobstructed data.

In other examples, at block 330, the occlusion handler 204 only updates the unobstructed data with patched data. In other words, frames in which no loader was detected are not assumed to represent unobstructed data. In this example, the method 300 may include an initialization step to store the first captured depth data and image data as the unobstructed data, wherein the first frame is assumed to be unobstructed. For example, the initialization step may be performed at power-up of the computing device 101. The initialization step may further include displaying a message, for example on the feedback device 106 to instruct the loader to stay out of the trailer to capture a first unobstructed frame. The occluded portions of subsequent frames are therefore patched using the unobstructed data, and the patched images (i.e. having the occluded portions replaced with the unobstructed data) are stored as the unobstructed data for future frames.

At block 335, the controller 120, and in particular the package placement module 208, obtains a location for the package scanned at block 303.

Figure 8:
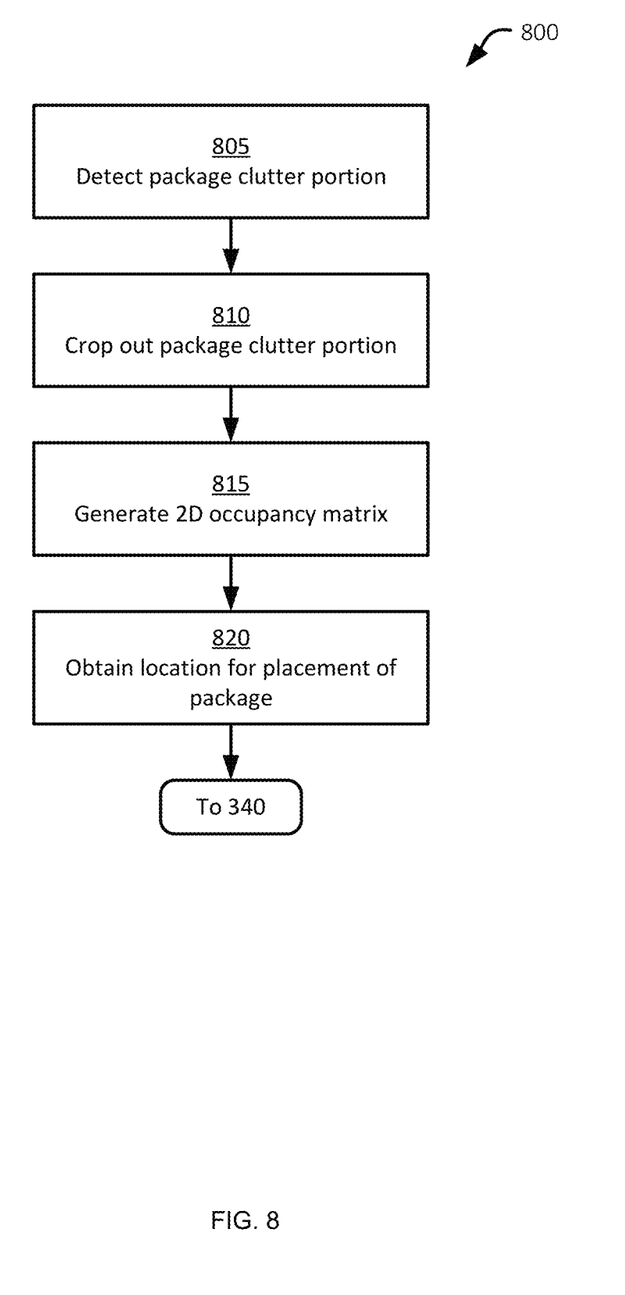
FIG. 8 depicts an embodiment of a method for performing block 335 of the method of FIG. 3.

Turning now to FIG. 8, a method 800 of obtaining a location for the package is depicted. In particular, the package placement module 208 is configured to perform the method 800 using the unobstructed depth data 735 from block 330. The performance of the method 800 results in a sequence 900 of image data and depth data results shown in FIG. 7. Accordingly, the method 800 of FIG. 8 and the sequence 900 of FIG. 9 will be described in tandem.

Figure 9:
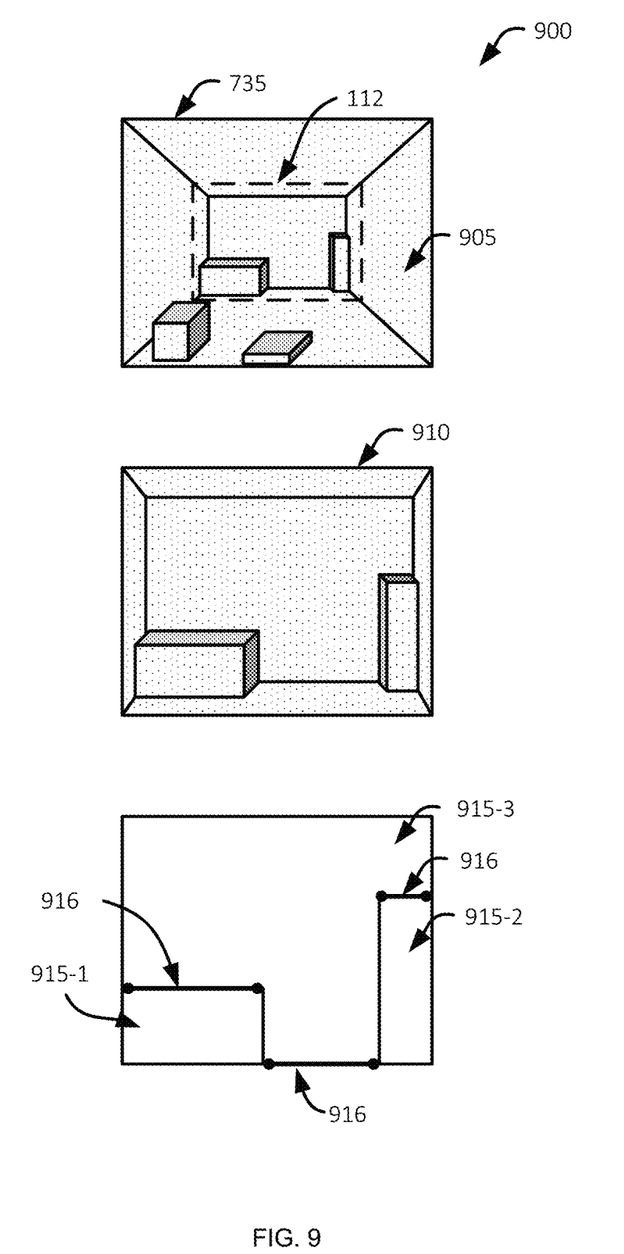
FIG. 9 depicts results of the performance of the method of FIG. 8.

At block 805, the package placement module 208 detects a package clutter portion of the unobstructed depth data. In the present example, the unobstructed depth data represents the package space 110 including package wall 112, and a package clutter portion 905. The package placement module 208 detects the package wall 112 of the package space, for example using a k-means clustering algorithm on the point cloud of the package space 110 to identify different objects (e.g. packages 116 or the package wall 112) in the point cloud. The package wall 112 is then identified based on qualities of the object. For example, the package wall 112 may be identified as the object or group of objects having the highest depth values, or the largest object, or other suitable identifiers. The package placement module 208 is further configured to set a distance threshold. For example, the package placement module 208 may define a single distance value representative of the package wall 112 as identified from the k-means clustering. For example, the distance value may be the average depth value of points associated with the package wall 112, or the minimum distance value of points associated with the package wall 112. The package placement module 208 then sets the distance threshold based on the distance value of the package wall and a distance padding value. For example, the distance padding value may be a predefined measurement (e.g. 5 cm in front of the package wall). In other examples, the distance padding value may be variable, for example, a calculated standard deviation of all points in the point cloud. In this example, the distance padding value can accommodate the distance of the package wall 112 from the depth sensor 105 by accounting for all other points in the point cloud. The package placement module 208 identifies the points of the unobstructed depth data having a smaller distance than the distance threshold. These points define the package clutter portion 905. In some examples, the package clutter portion 905 may include staged and queued packages. In other examples, the package clutter portion 905 may include portions of the container, including the side walls, floor and ceiling.

At block 810, the package placement module 208 crops out the package clutter portion 905 to generate cropped depth data 910. Since packages will be loaded at or near the package wall 112, the package clutter portion provides extraneous data not relevant for placing the package. Thus the package placement module 208 generates the cropped depth data 910 focusing on the package wall for processing at block 815.

At block 815, the package placement module 208 generates a 2D occupancy matrix based on the cropped depth data 910. For example, the package placement module 208 may extract the depth measurements of each point in the cropped depth data 910 to generate a 2D depth map (i.e. the occupancy matrix). The package placement module 208 then segments the package wall 112 into regions 915 of the occupancy matrix. For example, the regions 915 may be detected in 2D space using a mean-shift segmentation function. Specifically, the mean-shift segmentation function identifies different objects in the 2D occupancy matrix. In the example of FIG. 9, the region 915-1 corresponds to the package 114-1, the region 915-2 corresponds to the package 114-2, and the region 915-3 corresponds to the portion of the rear wall of the container not having any loaded packages 114 stacked in front. Each region 915 is morphed to close holes and eliminate noise, for example by applying a morphological erosion operation followed by a dilation operation. The regions 915 are then fitted into polygons of 3 or more line segments. The package placement module 208 identifies substantially horizontal line segments 916 representing flat surfaces for package placement.

At block 820, the package placement module 208 obtains a location within the package space for placement of the package. In particular, the package placement module 208 uses the occupancy matrix, the regions 915 and the horizontal line segments 916 in consideration of the metadata of package (e.g. the package dimensions, weight, destination, etc. obtained at block 303) to obtain a location for placement of the package.

Returning to FIG. 3, the control application 128 is then configured to proceed to block 340. At block 340, the controller 120, and in particular the output module is configured to present an indication of the location obtained at block 335.

In particular, the output module 212 is configured to communicate with the feedback device 106 to present the indication. In some examples, the feedback device may include a smart phone, tablet, wearable device, etc. and presenting the indication includes displaying an augmented reality image on the device. That is, the device 106 displays the unobstructed image data and overlays a visual indication, such as an outline or a digitally rendered package in the location generated at block 335. In other examples, the feedback device 106 may be a steerable pointing device configured to project the indication into the package space. For example, the steerable pointing device may be movably coupled to a frame for navigation, and the output module 212 may be configured to control and direct the movement of the steerable pointing device. The steerable pointing device therefore also includes a display element, such as a projector, a plurality of laser pointers, or the like, to project an indication of the package, such as an outline or a digitally rendered package, directly on the location in the package space 110. In still further examples, the feedback device 106 may include an audio device, for example, speakers connected to the computing device 101, or integrated with a tablet, smart phone, wearable device, etc. The output module 212 may be configured to control the speaker to provide an audio communication as the indication.

Variations to the above systems and methods are contemplated. For example, the system 100 can be deployed in an environment in which a plurality of containers, each having a respective package space 110, are filled from a common supply of packages. In such a deployment, the system can include a plurality of imaging devices, each configured to capture data for a respective container. Further, the computing device 101 can be configured to process captured data from the plurality of containers in parallel, and to select a placement location for a given package from any of the containers.

In other words, following the performance of block 303, the computing device 101 can be configured to perform a plurality of instances of blocks 305-330 in parallel (one instance per container). The computing device 101 can further be configured, having completed the parallel instances of blocks 305-330, to perform blocks 335 and 340 for the single package scanned at block 303 based on a plurality of distinct depth maps. Thus, a location can be selected and indicated for a package from any of the plurality of containers. The indication presented at block 340 can therefore include not only the selected location within a given package space 110, but also an identifier of which package space (e.g. one of a set of predefined container identifiers) the package is to be placed in.

In further embodiments, the data capture device, rather than being positioned at or near the loading end of a container as mentioned earlier, can be mounted to the loader 108. For example, the loader can be equipped with an augmented reality device including not only a display but also a depth camera or other suitable sensors (e.g. a heads-up display incorporating a depth sensor and a camera). The device 101 is configured to obtain a location of the loader (more specifically, of the augmented reality device), along with depth and image data captured by the device. Such a device can supplement or replace the fixed imaging device 103 mentioned above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of determining a location for placement of a package in an imaging controller comprising:
    obtaining a plurality of prior sets of depth data;
    obtaining intermediate depth data representing a package space;
    responsive to no occlusion being detected for the intermediate depth data, and no occlusion being detected for a threshold number of the plurality of prior sets of depth data, storing the intermediate depth data as an unobstructed depth data set;
    obtaining depth data representing the package space;
    detecting an occluded portion of the depth data representing an area of the package space obstructed by an occlusion;
    retrieving from the stored unobstructed depth data set an unobstructed depth data representing the area of the package space in the absence of the occlusion;
    replacing the occluded portion with the unobstructed depth data to generate patched depth data;
    obtaining, based on the patched depth data, a location within the package space for placement of a package; and
    presenting an indication of the location.

2. The method of claim 1, further comprising:
    detecting a package clutter portion of the depth data, the package clutter portion representing one or more staged or queued packages in the package space; and
    cropping the package clutter portion out of the depth data.

3. The method of claim 2, wherein detecting the package clutter portion of the depth data comprises:
    detecting a package wall of the package space;
    setting a distance threshold; and
    identifying one or more subsets of the depth data having a smaller distance than the distance threshold, the subsets defining the package clutter portion.

4. The method of claim 1, wherein the detecting comprises:
    obtaining image data of the package space;
    identifying a preliminary region containing the occlusion using the image data;
    retrieving a subset of the depth data corresponding to the image data within the preliminary region; and
    detecting the occluded portion within the subset of the depth data.

5. The method of claim 4, wherein identifying the preliminary region comprises:
    cropping the image data; and
    providing the cropped image data to an occlusion detector to generate the preliminary region.

6. The method of claim 4, wherein detecting the occluded portion comprises:
    selecting clusters of the depth data by comparing the depth data to predefined occlusion identifiers defining structural properties of an expected occlusion.

7. The method of claim 1, further comprising storing the patched depth data as the unobstructed depth data.

8. The method of claim 1, further comprising:
    prior to detecting the occluded portion, determining a proportion of missing depth data;
    when the proportion is below a predefined threshold, detecting the occluded portion; and
    when the proportion is above the predefined threshold, discarding the depth data.

9. The method of claim 1, wherein presenting the indication comprises at least one of: displaying an augmented reality image, projecting the indication via a steerable pointing device, and providing an audio communication.

10. The method of claim 1, further comprising: prior to obtaining the location, receiving a barcode scan of the package.

11. A computing device for determining a location for placement of a package, the computing device comprising:
    a communications interface coupled to a data capture device;
    a memory; and
    an imaging controller connected to the memory and the communications interface, the imaging controller configured to:
        obtain a plurality of prior sets of depth data;
        obtain intermediate depth data representing the package space;
        responsive to no occlusion being detected for the intermediate depth data, and no occlusion being detected for a threshold number of the plurality of prior sets of depth data, storing the intermediate depth data as an unobstructed depth data set;

obtain depth data representing a package space;

detect an occluded portion of the depth data representing an area of the package space obstructed by an occlusion;

retrieve from the stored unobstructed depth data set an unobstructed depth data representing the area of the package space in the absence of the occlusion;

replace the occluded portion with the unobstructed depth data to generate patched depth data;

obtain, based on the patched depth data, a location within the package space for placement of a package; and present an indication of the location.

12. The computing device of claim 11, wherein the imaging controller is further configured to:

detect a package clutter portion of the depth data, the package clutter portion representing one or more staged or queued packages in the package space; and crop the package clutter portion out of the depth data.

13. The computing device of claim 12, wherein the imaging controller is further configured to detect the package clutter portion of the depth data by:

detecting a package wall of the package space;

setting a distance threshold; and identifying one or more subsets of the depth data having a smaller distance than the distance threshold, the subsets defining the package clutter portion.

14. The computing device of claim 11, wherein the imaging controller is further configured to occluded portion by:

obtaining image data of the package space;

identifying a preliminary region containing the occlusion using the image data;

retrieving a subset of the depth data corresponding to the image data within the preliminary region; and detecting the occluded portion within the subset of the depth data.

15. The computing device of claim 14, wherein the imaging controller is further configured to identify the preliminary region by:

cropping the image data; and providing the cropped image data to an occlusion detector to generate the preliminary region.

16. The computing device of claim 14, wherein the imaging controller is further configured to detect the occluded portion by:

selecting clusters of the depth data by comparing the depth data to predefined occlusion identifiers defining structural properties of an expected occlusion.

17. The computing device of claim 11, wherein the imaging controller is further configured to store the patched depth data in the memory as the unobstructed depth data.

18. The computing device of claim 11, wherein the imaging controller is further configured to:

prior to detecting the occluded portion, determine a proportion of missing depth data;

when the proportion is below a predefined threshold, detect the occluded portion; and when the proportion is above the predefined threshold, discard the depth data.

19. The computing device of claim 11, wherein the imaging controller is further configured to present the indication by controlling at least one of:

a display to display an augmented reality image containing the indication;

a steerable pointing device to project the indication; and a speaker to generate an audible indication.

20. The computing device of claim 11, wherein the imaging controller is further configured, prior to obtaining the location, to receive a barcode scan of the package.

* * * * *